United States Patent
Ling et al.

(10) Patent No.: US 9,776,230 B2
(45) Date of Patent: Oct. 3, 2017

(54) ROLLING MILL WITH OPTIMIZED DETERMINATION OF CUTTING POINTS

(71) Applicant: PRIMETALS TECHNOLOGIES GERMANY GMBH, Erlangen (DE)

(72) Inventors: Yun Ling, Shrewsbury, MA (US); Paul Barry Riches, Paxton, MA (US)

(73) Assignee: PRIMETALS TECHNOLOGIES GERMANY GMBH (DE)

( * ) Notice: Subject to any disclaimer, the term of this patent is extended or adjusted under 35 U.S.C. 154(b) by 85 days.

(21) Appl. No.: 14/643,952

(22) Filed: Mar. 10, 2015

(65) Prior Publication Data

US 2016/0263636 A1  Sep. 15, 2016

(51) Int. Cl.
| | | |
|---|---|---|
| B21B 37/72 | (2006.01) | |
| B21B 1/16 | (2006.01) | |
| B21B 15/00 | (2006.01) | |
| B21B 38/00 | (2006.01) | |
| B23D 36/00 | (2006.01) | |

(52) U.S. Cl.
CPC ............... *B21B 37/72* (2013.01); *B21B 1/16* (2013.01); *B21B 15/0007* (2013.01); *B21B 38/00* (2013.01); *B23D 36/0016* (2013.01); *B21B 2015/0014* (2013.01); *B21B 2261/12* (2013.01); *B21B 2275/06* (2013.01)

(58) Field of Classification Search
CPC ......... B21B 1/16; B21B 15/007; B21B 37/72; B21B 38/00
See application file for complete search history.

(56) References Cited

U.S. PATENT DOCUMENTS 4,176,535 A   12/1979   Elsner et al.

FOREIGN PATENT DOCUMENTS

| DE | 2720136 A1 | 11/1978 |
|---|---|---|
| DE | 3636785 A1 | 5/1988 |

OTHER PUBLICATIONS

International Search Report and Written Opinion of the International Searching Authority dated Jun. 13, 2016 in corresponding International Application No. PCT/EP2016/054828 (English language translation)(10 total pages).

*Primary Examiner* — Teresa M Ekiert
(74) *Attorney, Agent, or Firm* — Ostrolenk Faber LLP

(57) ABSTRACT

A billet (2) is rolled to a rod (3) in a rolling mill. The rod (3) exits the rolling mill with a finishing temperature (TE1). A rear laser measurement device (8) arranged downstream of the rolling mill detects the head end and the speed (v) of the rod (3). The detected speed (v) of the rod (3) is integrated to its length and an instantaneous length (L) of the rod (3) is determined. Dependent on the determined instantaneous length (L) of the rod (3), cutting commands (S) to a rear shears (5) arranged downstream of the rolling mill are provided for cutting the rod (3) in sections (6) of predetermined length (L0). The sections (6) of the rod (3) are cooled down in a cooling bed (7).

19 Claims, 2 Drawing Sheets

ROLLING MILL WITH OPTIMIZED DETERMINATION OF CUTTING POINTS

TECHNICAL FIELD OF THE INVENTION

The present invention concerns a method of operation of a rolling mill for rolling a billet,
wherein the billet is rolled in the rolling mill to a rod, said rod exiting the rolling mill with a finishing temperature, wherein sections of the rod are cooled down in a cooling bed.

BACKGROUND OF THE INVENTION

In rolling mills of the above-mentioned type, billets are rolled to rods. Downstream of the rolling mill, shears are arranged. By means of the shears, the rolled rod is cut into sections of predetermined length. The total length of the rolled rod usually is determined by the initial length of the billet, taking into consideration the reductions in cross-section occurring in the rolling stands of the rolling mill. Additionally, sections separated by crop cuts within the rolling mill are taken into account. The accumulated length of the rod which has at a certain point of time exited the rolling mill usually is determined by the circumferential speed of rolls of the last rolling stand of the rolling mill, also taking into account the relationship between the speed of the rod exiting the last rolling stand and the circumferential speed of the rolls of the last rolling stand. For detecting the head end of the rolled rod, a hot metal detector for detecting presence of hot metal is used.

The method of the state of the art is complicated and inexact. In the state of the art, the predetermined length is determined such that the real length of the sections of the rod after cutting off the sections is larger than the minimum length which is the lowest permitted length. The additional length reduces the productivity and efficiency of the rolling mill.

SUMMARY OF THE INVENTION

It is an object of the present invention to provide a method of operation for a rolling mill for rolling a billet which minimises the oversize over the minimum length.

The object of the present invention is achieved by a method of operation disclosed herein. Preferred embodiments of the inventive method are disclosed herein.

According to the present invention, a method of operation of the above-mentioned type is augmented by
detecting by means of a rear laser measurement device arranged downstream of the rolling mill the head end and the speed of the rod,
integrating the detected speed of the rod, thereby determining an instantaneous length of the rod,
providing, in dependency on the determined instantaneous length of the rod, cutting commands to a rear shears arranged downstream of the rolling mill for cutting the rod in sections of predetermined length.

According to the invention, therefore, on the one hand by means of the rear laser measurement device the real and actual speed of the rod is detected. By integrating said speed, therefore, the instantaneous length of the rod can be determined with high accuracy. The instantaneous length of the rod is the length which at a certain point of time has passed the measuring point of the laser measurement device. On the other hand, by the laser measurement device also the presence of the rod can be detected. Therefore, the head end of the rod can be detected. A hot metal detector is no longer required.

In a preferred embodiment of the method of operation, when determining the cutting commands, a thermal shrinkage of the sections of the rod due to the difference between a finishing temperature and a normal temperature is taken into account. Therefore, higher accuracy in the determination of the predetermined length can be achieved.

Usually, the billet is heated in an oven arranged upstream of the rolling mill from an initial temperature to a rolling temperature. In a further preferred embodiment of the present invention,
by means of a laser measurement device arranged upstream of the oven, a length of the billet prior to heating in the oven is detected,
by means of a laser measurement device arranged downstream of the oven, a length of the billet after heating in the oven is detected,
by using the detected lengths of the billet prior to and after heating in the oven in combination with said initial temperature and said rolling temperature a coefficient of thermal expansion is determined, and
said coefficient of thermal expansion is taken into account when determining the expected thermal shrinkage of the sections of the rod.

Due to this embodiment, the predetermined length can be calculated with a smaller tolerance. The lengths of the billet are the total lengths of the billet prior to and after heating in the oven.

Preferably,
when feeding said sections of the rod to said cooling bed, by means of the rear laser measurement device actual lengths of the sections of the rod are detected,
after cooling said sections of the rod in said cooling bed actual lengths of the sections of the rod are detected by measurement, and
for subsequent billets the predetermined length is adapted in dependency on a set length, said actual lengths prior to cooling in said cooling bed and said actual lengths after cooling in said cooling bed.

Said actual lengths of said sections of the rod after cooling in the cooling bed may be detected, for example, by a downstream laser measurement device.

The laser measurement device may be arranged upstream of the rear shears. Preferably, however, the laser measurement device is arranged downstream of the rear shears. Due to this arrangement, the actual length of the respective sections of the rod may be detected immediately after separating said sections from the remainder of the rod very precisely. Possible errors in length may be detected instantaneously and correction may be provided for the next cutting operation.

Preferably, when determining the cutting commands, a calculated total length of the rod is taken into account. By this, there may be for example a change to a reduced predetermined length in due time. This may be necessary if otherwise, i.e. without reducing said predetermined length, a significant remaining length of the rolled rod would remain which may not be used otherwise and therefore would have to be scrapped. The total length of the rod may be determined in a conventional manner, for example as mentioned above.

Usually, the billet is rolled first in a front section of the rolling mill from an initial cross-section to an intermediate product which has an intermediate cross-section. Then, the intermediate product is rolled in a rear section of the rolling mill from the intermediate cross-section to a final cross-section. The final cross-section is the cross-section of the rolled rod. In a preferred embodiment of the present invention additionally it is provided, that the head end and the speed of the intermediate product are detected by a front laser measurement device arranged between said front section and said rear section of the rolling mill, that the detected speed of the intermediate product is integrated, thereby calculating the total length of the intermediate product, and that the total length of the intermediate product is taken into account when determining the total length of the rod.

Due to this embodiment, the total length of the rod determined by calculation can be determined very accurately.

Usually, the intermediate product is cropped at its head end and at its tail end by means of a front shears arranged between the front section and the rear section of the rolling mill. In this case, the total length of the intermediate product preferably is the total length of the intermediate product in its cropped state.

The front laser measurement device may be arranged upstream of the front shears. Preferably, however, the front laser measurement device is arranged downstream of the front shears. Due to this embodiment, the actual length of the cropped intermediate product can be detected very accurately.

Preferably, cutting commands for cropping the intermediate product are triggered on the one hand by the detection of the head end of the intermediate product by the front laser measurement device and on the other hand based upon an instantaneous length of the intermediate product determined by integrating the speed of the intermediate product detected by the front laser measurement device in combination with an expected total length of the intermediate product determined by calculation. Due to this embodiment, the cropping of the head end and of the tail end of the intermediate product may be achieved very precisely. The expected total length of the intermediate product may be determined from the length of the billet taking into account the total reduction in cross-section achieved in the front section of the rolling mill.

BRIEF DESCRIPTION OF THE DRAWINGS

The features, properties and advantages of the present invention will be understood more easily by the following description of preferred embodiments which are explained in combination with the drawings. In the attached drawings.

DESCRIPTION OF EMBODIMENTS

Figure 1:
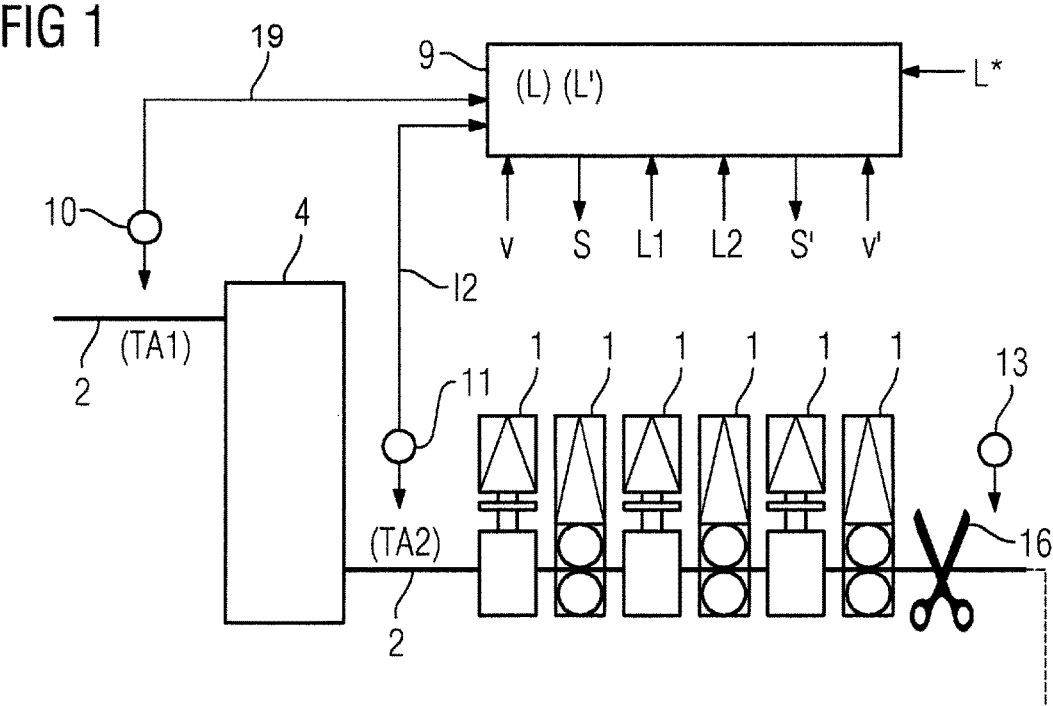
FIG. 1 shows a rolling mill.
Figure 1:
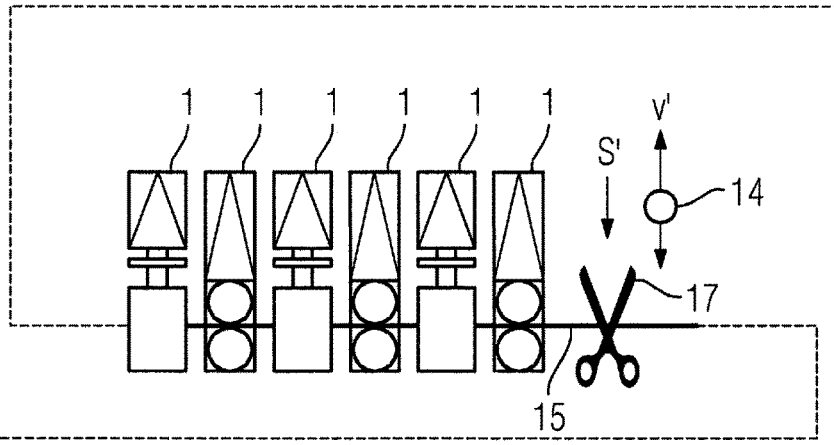
Figure 1:
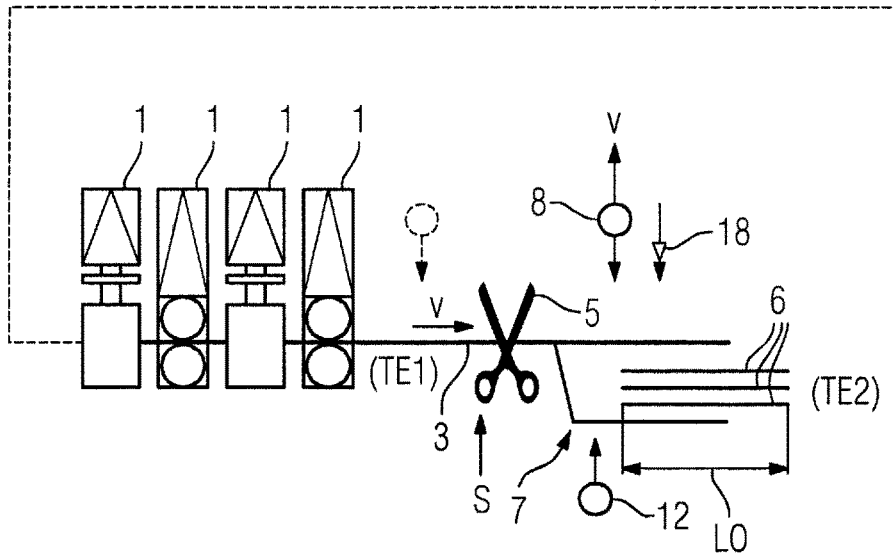
Figure 2:
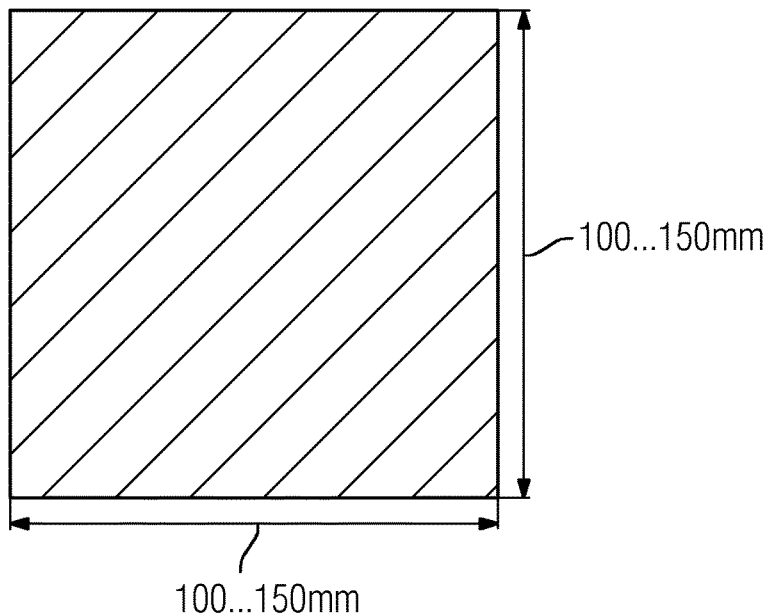
FIG. 2 shows a billet prior to rolling in cross-section.

As shown in FIG. 1, a rolling mill comprises a plurality of rolling stands 1. The rolling stands 1 may be configured, as shown in FIG. 1, alternately as horizontal rolling stands and vertical rolling stands. A billet 2 shall be rolled in the rolling mill of FIG. 1. A billet 2 is a rolling product prior to rolling in the rolling mill. It usually has a rectangular or circular cross-section, the width of the product and the height or thickness of the product being roughly equal. For example, a billet 2 may have, as shown in FIG. 2, a width in the range between 100 and 150 mm and a height or thickness also in the range between 100 and 150 mm. The width of the product and the height or thickness of the product may be equal. This is, however, not necessarily the case.

Figure 3:
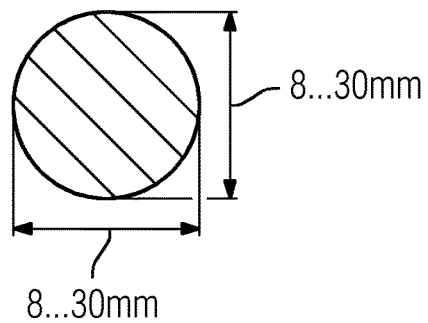
FIG. 3 shows a rod after rolling in cross-section.

The billet 2 is rolled in rolling stands 1 of the rolling mill step-by-step to a rod 3. A rod 3 is a product after being rolled in the rolling mill, i.e. which has exited the last rolling stand 1 of the rolling mill. The rod 3 may have a rectangular or circular cross-section, the width of the rod 3 and the height or thickness of the rod 3 being in the same order of magnitude. For example and as shown in FIG. 3, the billet 2 may be rolled to a rod 3 whose width is in the range between 8 and 30 mm and whose height also is in the range between 8 and 30 mm. The width and the height of the rolled rod 3 may be equal. This is, however, not necessarily the case.

As shown in FIG. 1, an oven 4 is arranged upstream of the rolling mill. In the oven 4, the billet 2 is heated from an initial temperature TA1 to a rolling temperature TA2. The initial temperature TA1 essentially is the ambient temperature. In most cases it is in the range between −20° C. and +50° C. Usually it is between 0° C. and 30° C. The rolling temperature TA2 usually is about 900° C.

The billet 2 is hot rolled in the rolling mill. The rolled rod 3 exits the rolling mill having a finishing temperature TE1. Downstream of the rolling mill a shears 5 is arranged. The shears 5 downstream of the rolling mill is designated in the following as rear shears. The rear shears 5 may be configured as flying shears, i.e. as shears travelling together with the rod 3 during cutting of the rod 3. By means of the rear shears 5 the rod 3 is divided in sections 6 of predetermined length L0. It is possible that the predetermined length L0 can adopt a single value exclusively, for example 60 m. Alternatively, it is possible that the predetermined length L0 can adopt one of several values, for example 60 m or 72 m.

Downstream of the rear shears 5 a cooling bed 7 is arranged. The sections 6 of the rod 3 are delivered to the cooling bed 7 and cooled down there. Usually, the sections 6 are cooled down to a final temperature TE2 essentially corresponding to the ambient temperature.

Downstream of the rolling mill a laser measurement device 8 is arranged. The laser measurement device 8 downstream of rolling mill in the following is designated as rear laser measurement device. The rear laser measurement device 8 is able to detect both the presence of the rod 3 and the actual speed v of the rod 3. Due to its ability to detect the presence of the rod 3, the rear laser measurement device 8 therefore is able to detect the head end of the rod 3 (i.e. its beginning). The rear laser measurement device 8 provides an identification signal for detecting of the head end of the rod 3 to a control device 9. It further provides the speed v of the rod 3 to the control device 9. The control device 9 usually controls the whole rolling mill. In particular, the control device 9 determines, based upon the detected speed v of the rod 3, an instantaneous length L of the rod 3. The determined instantaneous length L of the rod 3 is the length of the rod 3 which at a certain point of time has passed the rear laser measurement device 8. In dependency on the determined length L of the rod 3 the control device 9 transmits cutting commands S to the rear shears 5. The rear shears 5, based upon the respective cutting command S, cut the rod 3 and therefore creates a new section 6. The cutting commands S serve the purpose to cut the rod 3 into its sections 6.

The cutting commands S are triggered by the control device 9 taking into account the distance of the rear laser measurement device 8 from the rear shears 5, a reaction time of the rear shears 5, the speed v of the rod 3 and the predetermined length L0 (or the presently selected value of the predetermined length L0, if the predetermined length L0 can adopt several possible values). They are triggered such that the sections 6 have the desired length L0.

When deciding whether a cutting command S shall be outputted, in a preferred embodiment the control device 9 additionally takes into account an expected thermal shrinkage of the sections 6 of the rod 3. The thermal shrinkage results from the difference between the finishing temperature TE1 and a normal temperature. The normal temperature usually is in the range between 10° C. and 30° C. In most cases it is about 20° C.

Preferably and as shown in FIG. 1, upstream of the oven 4 there also is a laser measurement device 10. By means of this laser measurement device 10 a length 19 of the billet 2 prior to heating the billet 2 in the oven 4 is detected. Further and as also shown in FIG. 1, downstream of the oven 4 there also is a laser measurement device 11. By means of the laser measurement device 11 a length 12 of the billet 2 after heating the billet 2 in the oven 4 is detected. By means of these two laser measurement devices 10, 11, there may be detected each of the head end of the billet 2, the speed of the billet 2 and the tail end of the billet 2. By integrating the respective speeds, therefore, the control device 9 may determine the respective length 11 lengths 19, 12. The control device 9 further knows the initial temperature TA1 and the rolling temperature TA2. The control device 9 may therefore, by using the detected lengths 19, 12 of the billet 2 prior to and after heating in the oven 4, in combination with the initial temperature TA1 and the rolling temperature TA2, determine a coefficient of thermal expansion for the rod 3. The control device 9 further knows the finishing temperature TE1 and the normal temperature. The control device 9 may, therefore, by using the coefficient of thermal expansion, determine the expected thermal shrinkage of the sections 6 of the rod 3.

In order to further optimise the operation of the rolling mill, prior to cooling in the cooling bed 7 the rear laser measurement device 8 detects actual lengths L1 of the sections 6 of the rod 3. The lengths L1 are detected while feeding the sections 6 of the rod 3 to the cooling bed 7. The rear laser measurement device 8, therefore, is preferably arranged downstream of the rear shears 5.

Furthermore, after cooling in cooling bed 7, actual lengths L2 of the sections 6 of the rod 3 are detected by measurement. For detecting the actual lengths L2, there may be provided, as shown in FIG. 1, an additional laser measurement device 12. The laser measurement device 12 in the following is designated as downstream laser measurement device 12. For example, when delivering the cooled down sections 6 from the cooling bed 7, the downstream laser measurement device 12 may detect the head end, the tail end and the speed between the head end and the tail end of the corresponding sections 6 and provide the corresponding values to the control device 9. The control device 9 may then, based upon these corresponding values, determine the corresponding length L2. Consequently, the control device 9 can adapt the predetermined length L0. Adaption is done in dependency on a predetermined set length L* for the sections 6, on the actual lengths L1 of the sections 6 prior to cooling down in cooling bed 7 and of the actual lengths L2 of the sections 6 after cooling down in cooling bed 7. The adapted predetermined length L0 is used for subsequent billets 2 when cutting the rod 3 into sections 6.

In many cases the predetermined length L0 may adopt two or three values, wherein the values are a multiple integer of a predetermined basic value. For example, the length L0 may preferably be 72 m=6×12 m but may be shortened alternatively to 60 m=5×12 m. The inverse procedure is equivalently possible. Further, it may be the case that the predetermined length L0 additionally may adopt an additional third value, for example 84 m=7×12 m or 48 m=4×12 m. If the predetermined length L0 may adopt two or three values, the control device 9 takes into account a total length of the rod 3 when determining the cutting commands S. The total length of the rod 3 is the length which is expected for the rod 3 in total. It is a value determined by calculation. In particular, the control device 9 may based upon the determined total length of the rod 3 in combination with the possible values for the predetermined length L0 determine at which point of time a change from one of the permitted values for the predetermined length L0 to another of the permitted values for the predetermined length L0 shall be implemented.

As mentioned initially and as shown in FIG. 1, the rolling mill comprises several rolling stands 1. In many cases the rolling stands 1 are grouped in two or three groups of rolling stands 1. Subsequent groups are separated by a gap. In the respective gap, a laser measurement device 13, 14 may be provided. In the embodiment of FIG. 1, there are three groups of rolling stands 1 and correspondingly two laser measurement devices 13, 14. The laser measurement devices 13, 14 are designated in the following as first and second front laser measurement devices 13, 14. This language is used in order to distinguish them from the rear laser measurement device 8.

In the following, a preferred method of operation is explained in which the second front laser measurement device 14 is integrated in the method of operation of the rolling mill. The first laser measurement device 13 may be integrated in a similar way.

The rolling stands 1 upstream of the second front laser measurement device 14 are designated in the following as the front section of the rolling mill. The rolling stands 1 downstream of the second front laser measurement device 14 are designated in the following as the rear section of the rolling mill. The billet 2 is rolled in the front section of the rolling mill from an initial cross-section—for example of the cross-section of 150 mm×150 mm mentioned above—to an intermediate product 15. In the rear section of the rolling mill the intermediate product 15 is rolled to a final cross-section, i.e. the cross-section of the finished rod 3.

Figure 4:
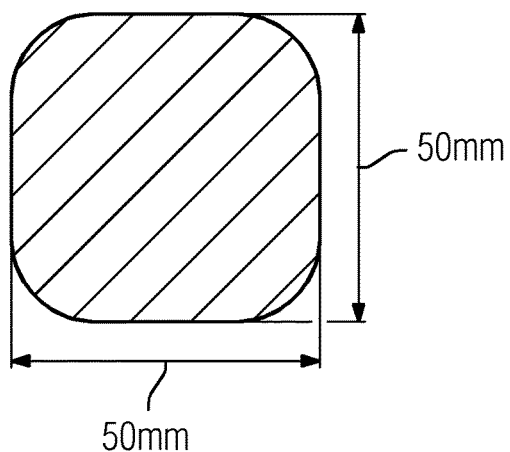
FIG. 4 shows an intermediate product in cross-section.

As shown in FIG. 4, the intermediate product 15 has a cross-section which is somewhere between the initial cross-section of the billet 2 and the final cross-section of the rolled rod 3. For example and as shown in FIG. 4, the intermediate product may have an intermediate cross-section of 50 mm×50 mm. It may, however, alternatively have another cross-section.

The intermediate product 15 is above and in the following designated as intermediate product in order to use language different from the yet unrolled billet 2 and from the finished rod 3. The intermediate product 15 is, however, not a product of its own. It is just a product which temporarily exists while the billet 2 is rolled to the finished rod 3. In particular, the intermediate product 15 after rolling in the last rolling stand 1 of the front section is fed directly and immediately—without buffering or storing—to the first rolling stand 1 of the rear section.

The head end and the speed v' of the intermediate product 15 are detected by the second front laser measurement device 14 and provided to the control device 9. The control device 9 integrates the detected speed v' of the intermediate product 15 and therefore determines a total length L' of the intermediate product 15. By using the total length L' of the intermediate product 15, the control device 9 determines the expected total length L of the rod 3. In particular, the control device 9 knows the reductions in cross-section occurring in the rolling stands 1 of the rear section of the rolling mill. The control device 9, therefore, is able to determine the expected total length L of the rod 3 by taking into account the reductions in cross-section and using the total length L' of the intermediate product 15.

Usually, in the gap between the front section and the rear section of the rolling mill, shears 16, 17 are arranged. The shears 16, 17 are designated in the following as front shears in order to distinguish them from the rear shears 5. By using the front shears 16, 17, the intermediate product 15 is cropped at its head end and its tail end. The front shears 16, 17 may be configured as flying shears. The respective front laser measurement device 13, 14 preferably is arranged downstream of the respective front shears 16, 17. The respective front laser measurement device 13, 14 therefore is able to detect the total length L' of the intermediate product 15 in its cropped state. This length is the total length L' of the intermediate product 15 used for determining the total length L of the rod 3.

The respective front laser measurement device 13, 14 may—analogously to the rear laser measurement device 8—be used for detecting the presence of the intermediate product 15. The beginning of the detection of the intermediate product 15, therefore, preferably triggers a cutting command for cropping the intermediate product 15. Furthermore, with high precision the instantaneous length of the intermediate product 15—i.e. the length which at that time has passed the respective front laser measurement device 13, 14—may be detected. In combination with the known or measured length 12 of the billet 2, therefore, with high precision there may be determined at which point of time the tail end of the intermediate product 15 will pass the respective front shears 16, 17. Consequently, by using the respective front laser measurement device 13, 14, the cropping of the tail end of the intermediate product 15 may be triggered with high precision. The corresponding cutting commands S' may be output by the control device 9 to the respective front shears 16, 17 at the appropriate points of time.

As shown in FIG. 1, additionally to the rear laser measurement device 8 a hot metal detector 18 is provided downstream of the rolling mill. The hot metal detector 18, however, is not essential to the present invention.

In short, therefore, the present invention concerns the following subject matter:

A billet 2 is rolled in the rolling mill to a rod 3, said rod 3 exiting the rolling mill with a finishing temperature TE1. By means of a rear laser measurement device 8 arranged downstream of the rolling mill, the head end and the speed v of the rod 3 are detected. The detected speed v of the rod 3 is integrated. Thereby an instantaneous length L of the rod 3 is determined. In dependency on the determined instantaneous length L of the rod 3 cutting commands S to a rear shears 5 arranged downstream of the rolling mill are provided for cutting the rod 3 in sections 6 of predetermined length L0. Said sections 6 of the rod 3 are cooled down in a cooling bed 7.

The present invention has many advantages. Most importantly, the sections 6 of the rolled rod 3 may be cut more precisely than in the state of the art to the predetermined length L0.

The present invention was explained above by a plurality of preferred embodiments. The present invention is, however, not restricted to these embodiments. Variations can be found easily by the person skilled in the art without deviating from the scope of the present invention which shall be defined solely by the attached claims.

LIST OF REFERENCE SIGNS 1 rolling stands
2 billet
3 rod
4 oven
5 rear shears
6 sections of the rod
7 cooling bed
8 rear laser measurement device
9 control device
10 laser measurement device upstream of the oven
11 laser measurement device downstream of the oven
12 downstream laser measurement device
13, 14 laser measurement devices
15 intermediate product
16, 17 front shears
18 hot metal detector
11, 12 length of billet
L0 predetermined length
L instantaneous length of the rod
L' total length of the intermediate product
L1, L2 actual lengths of sections
L* set length of sections
S, S' cutting commands
TA1 initial temperature
TA2 rolling temperature
TE1 finishing temperature
TE2 final temperature
v, v' speeds

The invention claimed is:

1. A method of operation of a rolling mill for rolling a billet;
wherein the billet is rolled in the rolling mill to a rod, and the rod exits the rolling mill at a finishing temperature of the rod;
the method comprising:
feeding the billet through the rolling mill for rolling the rod from the billet;
detecting a head end of the rod and a speed of the rod by a rear laser measurement downstream of the rolling mill;
mathematically integrating the detected speed of the rod for determining an instantaneous length of the rod;
providing cutting commands to a rear shears arranged downstream of the rolling mill for cutting the rod in sections of a predetermined length depending at least on the determined instantaneous length of the rod; and
cooling the cut sections of the rod.

2. The method of operation according to claim 1,
wherein the cutting commands are provided further depending on an expected thermal shrinkage of the cut sections of the rod due to the difference between the finishing temperature of the rod and a normal temperature.

3. The method of operation according to claim 2, further comprising:
heating the billet upstream of the rolling mill from an initial temperature to a selected rolling temperature;
performing a laser measurement upstream of the heating of the billet for detecting a length of the billet prior to the heating of the billet;

performing a laser measurement downstream of the heating of the billet for detecting a length of the billet after the heating of the billet;

using the detected lengths of the billet prior to and after the heating of the billet in combination with the initial temperature and the selected rolling temperature of the billet for determining a coefficient of thermal expansion of the billet; and using the coefficient of thermal expansion in combination with the finishing temperature and the normal temperature to determine the expected thermal shrinkage of the cut sections of the rod.

4. The method of operation according to claim 3, wherein the heating of the billet is performed in an oven, and a respective laser measurement device performs each of the laser measurements.

5. The method of operation according to claim 1, further comprising:

feeding the cut sections of the rod to be cooled, and when feeding the cut sections of the rod, performing a rear laser measurement for determining actual lengths of the cut sections of the rod;

after cooling of the cut sections of the rod, detecting actual lengths of the cut sections of the rod by measurement of the cut sections of the rod; and determining the predetermined length of the cut sections of the rod for subsequent billets dependent on a set length for the cut sections of the rod, the actual lengths of the cut sections of the rod prior to the cooling and the actual lengths of the cut sections of the rod after the cooling.

6. The method of operation according to claim 5, wherein the measurement of the cut sections of the rod after cooling is performed by a downstream laser measurement.

7. The method of operation according to claim 6, wherein the downstream laser measurement is performed downstream of the rear shears.

8. The method of operation according to claim 7, wherein a respective laser measurement device makes each of the laser measurements.

9. The method of operation according to claim 5, wherein a respective laser measurement device makes each of the laser measurements.

10. The method of operation according to claim 1, wherein providing the cutting commands further depends on a calculated total length of the rod.

11. The method of operation according to claim 10, further comprising:

rolling the billet in a front section of the rolling mill from an initial cross-section of the billet to an intermediate product which has an intermediate cross-section;

rolling the intermediate product in a rear section of the rolling mill from the intermediate cross-section of the intermediate product to a final cross-section of the rod;

detecting a head end and a speed of the intermediate product by a front laser measurement between the front section and the rear section of the rolling mill;

mathematically integrating the detected speed of the intermediate product for calculating a total length of the intermediate product; and calculating the total length of the rod based upon the total length of the intermediate product and a reduction in cross-section from the intermediate cross-section of the intermediate product to the final cross-section of the rod.

12. The method of operation according to claim 11, further comprising:

cropping the intermediate product at the head end thereof and at a tail end thereof by a front shears arranged between the front section and the rear section of the rolling mill, and wherein the total length of the intermediate product is the total length of the intermediate product in its cropped state.

13. The method of operation according to claim 12, further comprising:

performing the front laser measurement downstream of the front shears.

14. The method of operation according to claim 13, wherein a respective laser measurement device makes each of the laser measurements.

15. The method of operation according to claim 11, wherein a respective laser measurement device makes each of the laser measurements.

16. The method of operation according to claim 12, further comprising:

providing cutting commands for the cropping of the intermediate product based upon the detection of the head end of the intermediate product by the front laser measurement and based upon an instantaneous length of the intermediate product determined by mathematically integrating the speed of the intermediate product detected by the front laser measurement in combination with the total length of the intermediate product.

17. The method of operation according to claim 16, wherein a respective laser measurement device makes each of the laser measurements.

18. The method of operation according to claim 1, wherein the rear laser measurement is performed by a rear laser measurement device.

19. The method of operation according to claim 1, wherein the cooling of the cut sections of the rod is performed in a cooling bed.

* * * * *